United States Patent Office 3,376,300
Patented Apr. 2, 1968

3,376,300
O-(N-HETERO CARBONYL-INDOLYL-3)-GLYCOLIC ACIDS, AMIDES AND ESTERS THEREOF
Tsung-Ying Shen, Westfield, N.J., assignor to Merck & Co., Inc., Rahway, N.J., a corporation of New Jersey
No Drawing. Filed Dec. 31, 1964, Ser. No. 422,568
7 Claims. (Cl. 260—247.2)

This invention relates to new chemical compounds. More particularly, it relates to a new class of compounds of the indole series. Still more particularly, it is concerned with new O-(indolyl)-glycolic acids having an aromatic carboxylic acyl radical including aroyl and heteroaroyl radicals of less than three fused rings attached to the nitrogen atom of the indole ring. It is concerned also with salts, amides, anhydrides and esters of such compounds.

The novel aroyl and heteroaroyl α-(3-indoxyl) lower alphatic acids and their derivatives of this invention have the general formula:

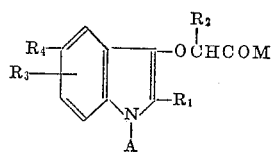

wherein A is a substituted or unsubstituted aromatic carboxylic acyl radical, preferably containing less than three fused rings, more specifically, an aroyl or heteroaroyl radical of the formula ArC=O wherein Ar is, for example phenyl, naphthyl or biphenyl, or the formula HetC=O wherein Het is for example, furyl, thienyl, pyrryl, thiozolyl, thiadiazolyl, pyrazinyl, pyridinyl, quinolyl, isoquinolyl, pyrazolyl, imidazolyl, oxazolyl, pyrimidinyl or a benz derivative thereof such as benzisoxazolyl, benzimidazolyl, benzofuranyl, benzothiazolyl, benzotriazolyl, benzoxazolyl, benzothienyl, indazolyl or isoindazolyl;

$R_1$ is hydrogen or a hydrocarbon radical having less than nine carbon atoms such as alkyl, for example, methyl, ethyl, propyl, isopropyl, butyl, and isobutyl; aryl and substituted aryl such as phenyl, alkoxyphenyl, for example, p-methoxyphenyl, p-ethoxyphenyl, m-butyoxyphenyl, o-propoxyphenyl, 2,4-dimethoxyphenyl, 3,4-dimethoxyphenyl and 3,4,5-trimethoxyphenyl and for example, p-chlorophenyl, p-bromophenyl, p-fluorophenyl, 3,4-dichlorophenyl and m-trifluoromethylphenyl; aralkyl, such as benzyl, p-methoxybenzyl, halobenzyl and the like;

$R_2$ is hydrogen, phenyl or a lower alkyl radical;

$R_3$ is hydrogen, halogen, trifluoromethyl or a lower alkyl or lower alkoxy radical;

$R_4$ is hydrogen, hydroxyl, halogen, lower alkyl such as methyl, ethyl, propyl or isopropyl, haloalkyl such as trifluoromethyl, aryl such as phenyl or biphenyl, lower alkoxy such as methoxy, ethoxy or propoxy, aryloxy such as phenoxy, aralkyloxy such as benzyloxy or phenethyloxy, cycloalkoxy such as cyclopropyloxy or cyclobutyloxy, alkenyloxy, such as allyloxy, amino, lower alkylamino such as methylamino, ethylamino or propylamino, di-lower alkylamino such as dimethylamino, diethylamino or methyl ethylamino, arylamino such as phenylamino or p-methoxy-phenylamino, alkylarylamino such as methyl or ethyl phenylamino, cyano, nitro, mercapto, lower alkylthio such as methyl-, ethyl-, propylor butyl mercapto and aralkythio such as β-phenethyl mercapto; and M is hydroxyl, amino, substituted amino, lower alkoxy, lower alkenyloxy, cyclic lower alkoxy, aryloxy and substituted lower alkoxy, lower alkenyloxy, lower alkynyloxy, cyclic lower alkoxy and aryloxy radicals; and OY wherein Y is a cation or may be represented by the formula

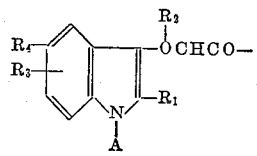

wherein A, $R_1$, $R_2$, $R_3$ and $R_4$ are as defined above.

Typical substitutents which may be represented by M include methylamino, ethylamino, butylamino, dimethylamino, diethylamino, allylamino, phenethylamino, N-ethylphenethylamino, benzylamino, anilino, p-chloroanilino, p-methoxyanilino, piperidino, pyrrolidino, morpholino, 1-methylpiperazino, N-phenylpiperazino, 1-(β-hydroxyethyl) - piperazino, 1-methyl-2-aminomethylpyrrolidino, 1 - ethyl - 2-aminomethyl piperidino, tetrahydrofurfurylamino, N-phenylpiperazino, N-carbobenzyloxymethylamino, N,N-dimethyl-carboxamidomethyl, 1,2,5,6-tetrahydropyridino, methoxy, ethoxy, n-butoxy, t-butyoxy, ethoxyethoxy, phenoxy, benzyloxy, diphenylmethoxy, triphenylmethoxy, cyclopropoxy, β-diethylaminoethoxy, β-dimethylaminoethoxy, phenethoxy, allyloxy, isopropoxy, N-β-hydroxyethylmorpholine, cyclopropylmethoxy, tetrahydrofurfuryloxy, cyclohexoxy, cyclopentoxy, cyclopropylmethoxy, p-acetaminophenoxy, o-carboxylphenoxy, polyalkyl alkoxy such as polyalkyl ethers of sorbitol, mannitol or other sugar alcohols containing up to six carbon atoms in the basic chain.

The invention also includes within its scope compounds wherein M is an ester group derived from N-(β-hydroxyethyl)piperidine, N-(β-hydroxyethyl)pyrrolidine, N-(hydroxymethyl)pyrrolidine, N - (β - hydroxyethyl)morpholine, 4-dimethylamino-cyclohexyl, N-methyl-2-hydroxymethyl pyrrolidine, N-methyl-2-hydroxymethyl piperidine, N-ethyl-3-hydroxypiperidine, 3-hydroxy-quinuclindine and N-(β-hydroxyethyl)-N'-methyl-piperazine.

The invention also includes compound in which M is a metal such as an alkali or alkaline earth metal cation.

Many of the compounds within the scope of the above definition are basic in nature and may be readily converted to acid addition salts. It is specifically intended to include those salts which are pharmaceutically acceptable within the purview of the invention. Such salts are formed by reaction between a free base of this invention and an acid having a pharmaceutically acceptable anion. The term "pharmaceutically acceptable anion" has a definite meaning to one skilled in the art. It is defined as a non-toxic anion of any of the simple acids used therapeutically to neutralize basic medicinal agents when the salts thereof are to be utilized therapeutically. These acids include both inorganic and organic acids, for example, hydrochloric, hydrobromic, hydriodic, sulfuric, succinic, phosphoric, maleic, tartaric, citric, glycolic and others. The pharmaceutical activity of the molecule is primarily a function of the cation. The anion serves primarily to supply electrical neutrality.

In the preferred compounds of this invention, A is benzoyl and substituted at the para position with chlorine, $R_1$ is hydrogen or lower alkyl such as methyl or ethyl, $R_2$ is hydrogen or lower alkyl, $R_3$ is hydrogen; $R_4$ is lower alkyl, lower alkoxy, halogen, trifluoromethyl or substituted amino.

A critical feature of these compounds is the presence of an aroyl or heteroaroyl radical attached to the N–1 position of the indole. Those acyl groups may be further substituted in the aromatic ring with hydrocarbon groups or with functional substituents. Thus, suitable aroyl substituents are the benzoyl and naphthoyl groups. The aromatic rings of such groups may contain, and in the preferred compounds do contain, at least one functional substituent. This substituent may be a hydroxy or an etherified hydroxy (hydrocarbonoxy) group such as a lower alkoxy, e.g. methoxy, ethoxy, isopropoxy, allyloxy, propoxy, an aryloxy or aralkoxy group, e.g., phenoxy, benzyloxy, halobenzyloxy, lower alkoxybenzyloxy and the like. It may be a nitro radical, a halogen such as chlorine, bromine, iodine or fluorine, an amino group or a substituted amino group, representative examples of which that might be mentioned are acylamino, amine oxide, ketimines, urethanes, lower alkylamino, lower dialkylamino, amidine, acylated amidines, hydrazine or a substituted hydrazine, alkoxyamines and sulfonated amines. Further, it may be a mercapto or a substituted mercaptor radical of the type exemplified by alkylthio groups such as methylthio, ethylthio, and propylthio and aralklthio or arylthio groups, e.g., benzylthio and phenylthio. The N–1 aroyl radical may, if desired, be haloalkylated, as with a trifluoromethyl, trifluoroethyl, perfluoroethyl, β-chloroethyl or like substituent, acylated as with acetyl, propionyl, benzoyl, phenylacetyl, trifluoroacetyl and like acyl groups, or it may contain a haloalkoxy or haloalkylthio substituent. In addition, the invention embraces compounds wherein the aroyl radical contains a sulfamyl, benzylthiomethyl, cyano, sulfonamido or dialkylsulfonamido radical. Further, it may contain a carboxy substituent, or a derivative thereof, such as an alkali metal salt or a lower alkyl ester of the carboxy radical, an aldehyde derivative of the type represented by acetals or thioacetals. In the preferred compounds, the N–1 aroyl radical is benzoyl and the functional substituent is in the para position of the six membered ring.

As aforesaid the N–1 group may be a heteroacyl substituent, and more precisely a heteroaroyl substituent of the formula

wherein Het represents a five- or six-membered heteroaromatic ring which may be part of a fused ring system containing less than three fused rings.

The compounds of this invention may be regarded as derivatives of glycolic acid in which the hydrogen atom of the hydroxyl group is replaced with an indolyl radical. Also included within the scope of the invention are glycolic acid derivatives in which a hydrogen atom on the α-carbon atom is replaced with an alkyl or phenyl group. Such compounds can be described as O-(indolyl)-α-alkyl-glycolic acids. They will be so named herein.

The 2-position of the indole ring nucleus ($R_1$ in the above formula), may be hydrogen although it is preferred that there be present in this position of the molecule a hydrocarbon radical having less than nine carbon atoms. Lower alkyl groups such as methyl, ethyl, propyl or butyl are the most satisfactory.

The following compounds are representative of those contemplated by this invention. These and others may be obtained from known or readily prepared starting materials by the procedures discussed below.

t-butyl O-[1-(p-chlorobenzoyl)-5-methoxy-3-indolyl]-glycolate;
benzyl O-[1-(p-methoxybenzoyl)-5-fluoro-3-indolyl]-glycolate;
O-[1-benzoyl-2-methyl-5-methoxy-3-indolyl]-glycolic acid;
allyl O-[1-(p-methylthiobenzoyl)-5-ethoxy-3-indolyl]-glycolate;
phenyl O-[1-(1-naphthoyl)-2-ethyl-5-nitro-3-indolyl]-α-propyl-glycolate;
N,N-diethyl-O-[1-(p-chlorobenzoyl)-2-methyl-3-indolyl]-glycolamide;
p-chlorophenyl O-[1-(2-thenoyl)-2-methyl-5-methoxy-3-indolyl]-α-methyl-glycolate;
β-diethylaminoethyl O-[1-(p-chlorobenzoyl)-2-methyl-5-methoxy-3-indolyl]-glycolate hydrochloride;
methyl-[1-(p-chlorobenzoyl)-2-methyl-5-dimethylamino-3-indolyl] glycolate citrate.

The O-[1-(aroyl or heteroaroyl)-3-indolyl]-glycolic acids and derivatives thereof described herein are synthesized by acylation of the O-[3-indolyl]-glycolic acid, ester of amide having the desired substituents on the indolyl nucleus and/or on the α-carbon atom of the substituted glycolic acid or derivative. It is preferred to carry out the acylation on an ester or amide derivative of the glycolic acid. In those cases where the free acid is desired, the ester may be converted under suitable reaction conditions to the free acid. It has been observed that the 1-aroyl or heteroaroyl substituent is easily hydrolyzed under conditions normally employed for saponification of an ester to the free acid. For this reason, care must be taken in converting the acid esters to the corresponding free acids. It has been found that one convenient method of accomplishing this conversion comprises acylation of the benzyl ester and subsequent hydrogenolytic removal of the benzyl group. Alternatively, other esters such as the t-butyl esters, which are amenable to selective removal by other treatment, such as heating above 210° C. or by heating at 25–110° C. in the presence of a catalytic amount of an aryl sulfonic acid or other acids may be utilized. When, instead of an ester, the amides of these acids are prepared, the free acids are formed by reaction of the amides with a stoichiometric quantity of nitrous acid in an inert solvent.

The acylation reaction is preferably conducted by treating the α-(3-indolyl)-lower aliphatic acid starting material with an alkali metal hydride such as sodium hydride to form e.g., a sodium salt and then intimately contacting said salt with an aroyl or heteroaroyl acid halide in an anhydrous solvent medium. It is preferred to employ solvents such as dimethylformamide, dimethylformamide-benzene, benzene, toluene or xylene. It is preferred to carry out the acylation at about room temperature although lower temperatures may be employed if the particular reactants are unduly susceptible to decomposition.

An alternative method of acylating the 1-position is by use of a phenolic ester of the acylating acid, such as the p-nitrophenyl ester. This latter is prepared by mixing the acid and p-nitrophenol in tetrahydrofuran and adding dicyclohexyl carbodiimide in tetrahydrofuran slowly. The dicyclohexylurea which forms is removed by filtration and the nitrophenylester is recovered from the filtrate. Alternatively, there can also be used the anhydride, azide or thiophenolic ester of the acylating acid. Whichever is used, the acylation of the α-(3-indolyl)-lower aliphatic acid starting material is achieved by forming a sodium salt of said material with sodium hydride in an anhydrous solvent and adding the nitrophenylester.

The α-(1-aroyl or heteroaroyl-3-indolyl)-lower aliphatic acid compounds of this invention have a high degree of anti-inflammatory activity and are effective in the prevention and inhibition of granuloma tissue formation. Certain of them possess this activity in high degree and are of value in the treatment of arthritic and dermatological disorders and in like conditions which are responsive to treatment with anti-inflammatory agents. In addition, the compounds of this invention have a useful degree of anti-pyretic activity. For these purposes, they are normally administered orally in tablets or capsules, the optimum dosage depending, of course, on the particular compound being used and the type and severity of infection being treated. Although the optimum quantities of these compounds of this invention to be used in such manner will depend on the compound employed and the particular type of disease condition treated, oral dose levels of preferred compounds in the range of 1.0–2000 mg. per day are useful in control of arthritic conditions, depending on the activity of the specific compound and the reaction sensitivity of the patient.

The indolyl glycolic acids and their derivatives employed as starting material in the reaction discussed above, and having the formula:

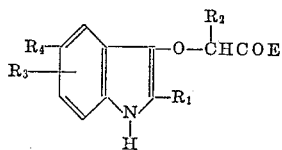

wherein $R_1$, $R_2$, $R_3$ and $R_4$ have the previously defined meaning and E is a hydrocarboxy radical having less than nine carbon atoms or $-NH_2$ may be synthesized in various ways. Particularly valuable starting compounds used in the preparation of these starting materials include anthranilic acid and its derivatives.

The following reaction sequence illustrates one procedure utilizing anthranilic acid or its derivatives. (In this sequence and any of the following sequences the values for A, $R_1$, $R_2$, $R_3$, $R_4$, M and E are the same as above unless otherwise noted.)

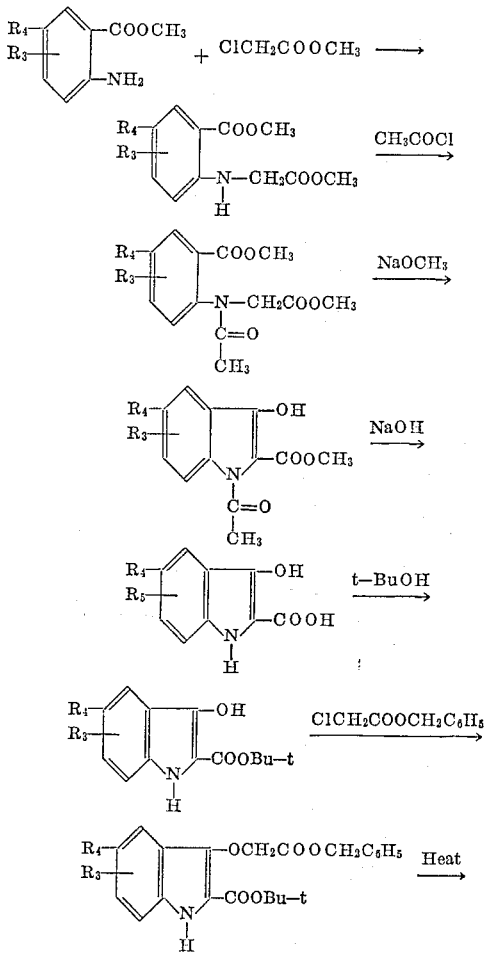

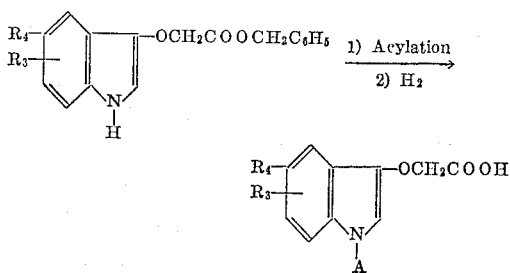

In the first step of the above reaction sequence, a lower alkyl anthraniliate or anthranilic acid which may be further substituted on the phenyl ring as indicated is reacted with an α-halo organic acid or lower alkyl ester thereof. These latter compounds may be regarded as derivatives of acetic acid. Thus, α-chlor-propionic acid and esters may be considered as α-methyl-α-chloroacetic acid or ester and α-bromo-β-phenyl-propionic acid may be considered as α-benzyl-α-bromoacetic acid ester.

Reaction is effected in a reaction inert solvent such as water or an organic solvent preferably a lower alkanol such as methanol or ethanol at an elevated temperature, e.g., from about 70° C. to about 120° C. It is most convenient to reflux the reaction mixture of from about 4 to about 48 hours. Longer reaction times are not harmful and may be used if desired. The reaction may be carried out in the presence of an alkaline reagent such as sodium or potassium hydroxide or carbonate to neutralize the acid by-product. The product may be isolated in any convenient manner for example by removal of the solvent by distillation or by solvent extraction. It may be purified, if desired, by any of the usual methods such as chromatography or crystallization.

Acylation of the substituted amino group is brought about in the usual manner, for example by reaction with acetic anhydride or acetyl halide, suitably chloride or bromide. Reaction may take place with or without a solvent. It is convenient to utilize excess anhydride as a solvent. The initial reaction is, in most instances, exothermic and may require some cooling. It is, however, preferred to insure as complete a reaction as possible by completing the reaction with heat. It is best to add an excess of the acylating agent and to warm at about 60° C. to about 100° C. for from about one-half to about two hours. The product may be isolated and purified in any convenient manner.

Ring closure to produce the 1-acylated indoxylic acid is effected by an intramolecular ester condensation in which methyl alcohol is formed from the methoxy portion of the carbomethoxy group and the α-hydrogen atom of the carbmethoxymethylene amino group in the presence of a basic reagent and split out to form an intermediate which rearranges to form the desired compound. It is most convenient to effect reaciton simply by allowing the compound to stand at from about 25° C. to about 35° C. for from about one-half to about three hours in a lower alkanol containing an alkali metal alcoholate. Sodium methoxide in methanol is especially convenient.

An alternative procedure for ring closure which provides an N-O-diacyl compound, for example, methyl-1,3-diacetyl-indoxylic acid, is to heat the starting compound, for example the N-acetyl-phenylglycine compound illustrated above with a lower acyl anhydride and a salt of a lower alkanoic acid. With liquid anhydrides such as acetic or propionic anhydride it is preferred to use excess anhydride as the solvent. Alternatively, a reaction inert organic solvent may be employed. A preferred reactant combination is acetic anhydride and anhydrous sodium acetate. Whatever combination of reactants is used, the preferred temperature and time range is from about 100° C. to about 200° C. for a period of from about 15 to about 45 minutes. Longer reaction times may be employed, but generally undesirable quantities of by-products are formed.

Whether a mono- or a diacylate is formed, the next step is to hydrolyze the acetyl groups. Hydrolysis is preferably effected in water using a dissolved base such as an alkali or alkaline earth metal oxide, hydroxide or carbonate. The preferred alkaline reagents are sodium and potassium hydroxide. Hydrolysis is brought about at an elevated temperature, say for example about 60° C. to about 100° C., most conveniently by refluxing for from about 15 to about 30 minutes. An inert atmosphere, for example nitrogen helps to minimize side reactions but is not essential. The product may be isolated in any convenient manner. For example, it may be extracted from the aqueous solution after the alkaline reagent is neutralized. Alternatively, the neutralized aqueous mixture may be distilled at low pressure to remove the solvent and the residue washed with ice cold water to remove the salt or take up in an organic solvent in which the salt is insoluble.

The t-butyl ester is formed by reaction of the free acid with t-butanol. The reaction is best carried out using an acid catalyst and anhydrous alcohol in a solvent such as benzene which forms an azeotrope with water. The water which forms during the reaction is thus distilled off as it forms.

The glycolic acid portion of the molecule is added next by reaction between the t-butyl indoxylate and an ester of an α-halo-acetic acid α-diazo acetic acid or an alkyl or phenyl or benzyl substituted acetic acid. (It will be recalled as explained above that propionic acid and other acids may be considered to be derivatives of acetic acid.) This reaction is preferably carried out at a low temperature, e.g., about 5° C. to about 20° C. in a lower alkanol solvent containing the indoxylate while slowly adding an alkali metal alcoholate, preferably the alcoholate corresponding to the selected alkanol. Preferred pairs include sodium ethoxide in ethanol and potassium t-butoxide in t-butanol, although others are suitable. The product can be isolated in any convenient manner. It will be recognized that this step of the synthesis is an advantageous position at which to vary the ultimate product. Thus, if an acetice acid ester is employed, a glycolate is ultimately produced, but if α-chloropropionic acid (α-chloro-α-methyl-acetic acid) is used the ultimate product is an α-methyl glycolic acid derivative.

It is, of course, also possible to vary the ester derivative. Thus, instead of a benzyl ester, a methyl, ethyl, propyl or other ester may be produced by utilizing the appropriate α-halo acetate.

Removal of the carbo-t-butoxy group at the 2-position of the indolyl nucleus affords the desired O-(3-indolyl) glycolic acid or derivative. This may be effected by pyrolysis, for example by heating above 200° C. in the presence of porous plate chips or other high surface area catalyst such as ground glass. It is best to pyrolyze in an inert atmosphere such as nitrogen to minimize side reactions. In a preferred method of carrying out the reaction, the compound is intimately mixed with the catalyst and the temperature slowly increased until decomposition is evident. The decomposition temperature is maintained until reaction is complete. Although temperature and time of reaction vary with the product, a temperature of from about 200° C. to about 210° C. for from about one to two hours is generally adequate.

Although this discussion for purposes of illustration has been primarily directed to 2-carbo-t-butoxy compounds, it will be recognized that the synthesis is not so limited. Many variations will be apparent to those skilled in the art.

The last step illustrated in the above synthesis is acylation followed by the removal of the benzyl group by hydrogenolysis. This reaction would only be carried out if the benzyl ester was desired as an intermediate. It would be unnecessary if the final product was to be utilized as a benzyl ester. The benzyl ester could be used, for example, as an intermediate in the preparation of the free acids which could in turn be employed in the preparation of other esters or amides.

Instead of preparing a benzyl ester, it is often convenient to prepare a t-butyl ester and to remove it pyrolytically with the removal of the same group at the 2-position.

Since, as has been mentioned earlier, the 1-acyl group on the indole nucleus is easily hydrolyzed under the conditions normally used to saponify esters, the above-mentioned benzyl and t-butyl esters are especially useful. The t-butoxy and benzyloxy groups can be removed under non-hydrolytic conditions.

The esters of this invention can be prepared in various ways. The starting compounds can be substituted with the desired ester group. Alternatively, the free acid may be converted initially to a symmetrical anhydride by the action of a mild dehydrating agent such as dicyclohexyl carbodiimide. This procedure also provides the preferred method of preparing anhydrides within the scope of this invention. The anhydride is then reacted with the selected alcohol to form the desired ester. This latter reaction preferably takes place in the presence of a non-hydroxylic base such as a tertiary alkylamine, or pyridine and the like.

Esters may also be prepared by the same reaction using mixed anhydrides. Such mixed anhydrides are formed by reaction of a free acid with a non-hydrolytic base such as mentioned above. The mixed anhydride is obtained by reaction of the resulting amine salt with an alkyl or aryl chloroformate, phosphorous oxychloride, thionyl chloride or similar reagent.

The amides of this invention may be prepared either before acylation of the 1-position of the indole nucleus or the acylated compound may be transformed through the free acid to the amide. The amides are formed by reaction of the acid halide (e.g., the chloride) or a mixed anhydride with ammonia or the desired amine. Of course, if ammonia is used acylation at the 1-position must be effected before the amide is formed.

The acid, when acylated at the 1- position, can be conveniently transformed into a mixed anhydride by reacting with a tertiary amine followed by another acid halide such as alkyl chloroformate. If the acylation is not carried out until after the amide is formed, the 1-unsubstituted indolyl compound can be subjected to more direct methods such as reaction with thionyl chloride, phosphorous oxychloride or like reagent, to form the acid halide. These mixed anhydrides, whether 1-substituted or not are then reacted with the desired amines to form the amides of this invention.

Still another general method which may be used to prepare the compounds of this invention may be illustrated by the following reaction sequence:

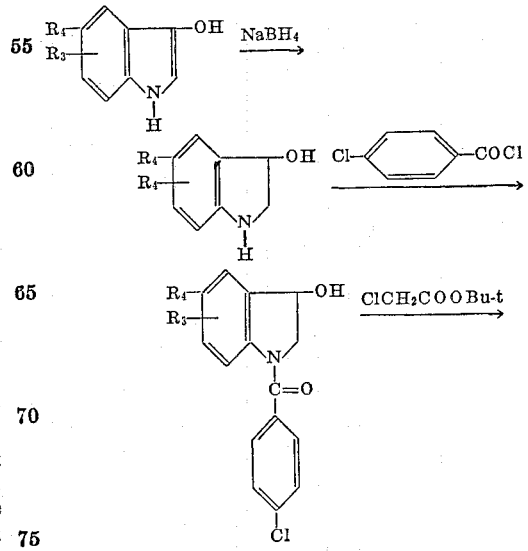

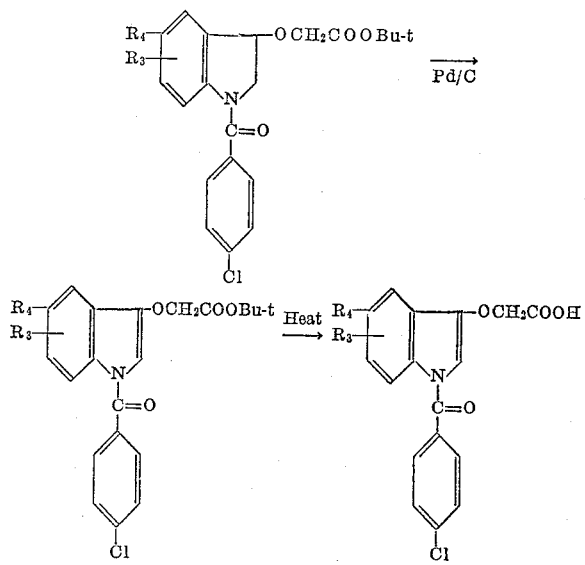

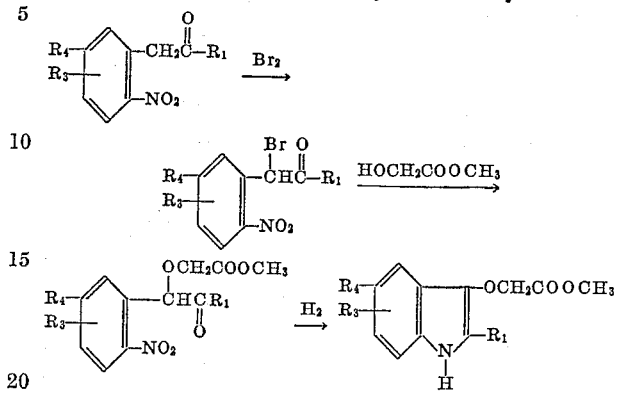

In the first step of the reaction an indoxyl is reduced to a 3-hydroxy-indoline. The indoxyl may be prepared in accordance with the procedure generally illustrated above by forming the t-butyl ester of indoxylic acid and pyrolyzing. Reduction is effected utilizing an alkali metal borohydride. In a preferred procedure, the indoxyl is taken up in a polar solvent such as water or a lower alkanol and a water or lower alkanol solution of sodium boryhydride is added while maintaining the temperature at from about 25° C. to about 40° C. Some indoxyl compounds may require warming, e.g., to about 70° C. to complete the reaction. Generally, excess reducing agent is used. The borohydride solutions may be stabilized by the addition of an alkaline reagent such as 0.2 N sodium hydroxide. At the end of the reaction period, the excess borohydride is decomposed by acid and the desired product recovered.

Acylation at the 1-position is brought about by treatment of the 3-hydroxy indoline with an acid halide, suitably an acid chloride in the presence of a base, preferably a tertiary amine such as pyridine. The activity of the hydrogen atom attached to the heterocyclic nitrogen is such that there is little interference from the hydrogen atom of the hydroxyl group.

The 1-acylated compound is next converted to a glycolic acid derivative by reaction with an α-halo acetic acid in accordance with the procedure described above. As in the procedure described above, this reaction affords a convenient step at which to vary the ultimate product by appropriate choice of the acetic acid derivative.

The indoline derivative of glycolic acid thus formed is next oxidized to an indolyl compound. This is conveniently effected by dehydrogenation with a catalyst such as palladium on carbon. In a preferred method, the indoline is taken up in an aromatic hydrocarbon solvent such as xylene containing from about one-half to about the same weight of 5% palladium on carbon and the mixture maintained at an elevated temperature, i.e. about 50° C. to about 150° C. preferably under reflux for from about two to about six hours. At the end of this period, the nickel is removed by filtration and the desired product recovered by removal of the solvent by low pressure distillation.

The compound produced by the foregoing reaction is within the scope of this invention. It is illustrated as a t-butyl ester. By appropriate selection of the ester derivative of acetic acid used in the reaction sequence other esters may be produced. If desired the t-butyl ester may be converted to a free acid by the pyrolytic method described above, and the acid, thus produced converted to another ester or to an amide, anhydride or salt of this invention.

Still another procedure which may be used to prepare starting materials useful for the preparation of the final compounds of this invention is illustrated by the following reaction sequence wherein $R_5$ is lower alkyl.

In the first step of the above illustrated sequence, a 1-(2-nitrophenyl)-2-alkanone such as 1-(2-nitrophenyl)-2-propanone is halogenated at the number one carbon atom by reaction with a molecular halogen such as bromine.

In a preferred modification of the reaction a molar excess of molecular bromine is slowly added to a solution of the alkanone in a reaction inert organic solvent such as a lower alkanoic acid, for example acetic or propionic acid. The temperature is maintained at from about −5° C. to about 10° C. during the addition. The desired product forms and may be isolated, for example by pouring into water, preferably at about 5° C. and extracting with a solvent such as a halogenated alkane, for example chloroform or ethylene chloride. Removal of the solvent, preferably after drying leaves the desired product as a residue.

The halogenated compound is next converted to a glycolic acid derivative by reaction with a glycolic acid ester such as the methyl glycolate illustrated above. For convenience, these compounds may be considered as acetic acid derivatives. An ester of α-hydroxy propionic acid (α-methyl-α-hydroxy acetic acid) will ultimately produce the corresponding ester of an α-methyl substituted O-(3-indolyl)-glycolic acid. As in the above illustrated reaction sequences, this step affords an opportunity to vary the ultimate reaction product by appropriate selection of the hydroxy-acetic acid derivative.

The next step in the synthesis is reduction of the nitro group with simultaneous ring closure. This is best effected using an hydrogenation catalyst such as Raney nickel. The nitro compound is taken up in a reaction inert organic solvent such as a lower alkanol, for example methanol or ethanol in which the catalyst is suspended. Molecular hydrogen is bubbled through the reaction mixture at from about 25° C. to about 35° C. The reaction may be aided by keeping the hydrogen under pressure, for example up to about 60 pounds per square inch although standard pressure conditions may be employed. After removal of the catalyst by filtration, the desired product may be recovered in any convenient manner.

The O-(3-indolyl)-glycolate thus formed may be utilized in accordance with the procedures described above to produce the final products of this invention.

The synthesis of various compounds of this invention having on the indole ring system a 5-substituent which has a nitrogen atom attached to the homocyclic ring of the indole is generally based on the 5-nitro compound. This is transformed into the desired substituent. Such transformation may be before or after acylation of the 1-position depending on the extent to which the desired 5-substituent may interfere with the acylation. If such interference is possible, the 1-acylation should be carried out on the 5-nitro indole and the nitro later transformed into the desired 5-substituent. Such transformation can be carried out in a number of ways. Reduction of the 5-nitro group gives the 5-amino group. Reaction of the amino with alkyl halides gives mono- and dialkyl amino groups. If the alkyl halide is a dihaloalkylene group (e.g., 1,4-dibromobutane) a heterocyclic ring such as pyrrolidino is formed. Similarly, bis(β-chloroethyl) ether will give an N-morpholino compound. Alkylation can also be carried out simultaneously with reduction, as with formaldehyde and hydrogen. Acylation can similarly be carried out on the 5-amino compounds or on the 5-nitro compounds (with simultaneous reduction) to give 5-acylamido compounds. The 5-amino group can be reacted with isocyanates to give 5-ureido compounds.

The procedures outlined above can be altered somewhat without departing from the spirit and scope of this invention.

Metallic salts, e.g., alkali metal or alkaline earth metal salts of this invention are most conveniently prepared by adding the free acid to an aqueous solution of the base such as sodium, potassium or barium hydroxide. Evaporation of the water leaves the desired salt as a residue.

Example 1.—Methyl N-acetyl-N-(carbomethoxymethyl) anthranilate

A solution of 500 g. of methyl anthranilate and 180 g. of methyl chloroacetate in 600 ml. of methanol is refluxed for six days. The methanol is removed by distillation and the reaction mixture shaken with chloroform and water. The chloroform layer is separated and washed with aqueous sodium carbonate and then with water. The chloroform and unreacted starting products are removed by distillation at low pressure. The residue is poured into 600 ml. of 95% ethanol and allowed to stand at about 25° C. until crystallization takes place. The crystals of dimethyl phenylglycine-o-carboxylate are collected and washed with cold ethanol.

Fifty g. of the crude ester from the preceding preparation are mixed thoroughly with 35 g. of acetyl chloride. After the initial vigorous evolution of hydrogen chloride subsides, the mixture is then heated for an hour at about 90° C. The mixture is then poured into 100 ml. of water and the aqueous mixture extracted with chloroform and the extraction solvent removed by distillation under reduced pressure. The residue is dissolved in 30 ml. of methanol, and sufficient water (about 100 ml.) added to produce permanent turbidity. Addition of seed crystals and shaking causes the product to separate in crystalline form. After standing for several hours at about 0° C. the product is recovered by filtration.

Using the appropriate anthranilates and α-halo acetic acid derivatives in accordance with the foregoing procedure, the N-acetyl derivative compounds listed below are similarly prepared. Although the compounds are listed as methyl esters, it should be understood that other esters are similarly prepared as are other N-acyl derivatives. For convenience, the compounds are listed as derivatives of glycine. The system will be better understood by reference to the following formulas showing methyl N-acetyl - N - (carbomethoxymethyl)anthranilate (I) and methyl N-acetyl-N-(carbomethoxyethyl)anthranilate II.

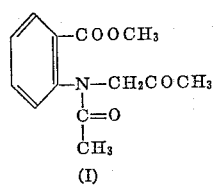
(I)

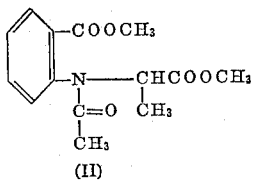
(II)

Substituents on the phenyl ring are numbered using a system based on anthranilic acid. In accordance with the system 3-nitro-anthranilic acid is 2-amino-3-nitrobenzoic acid. Applying this system to the phenylglycines, the following compound is methyl N-acetyl-N-(carbomethoxymethyl)1-5-methoxy anthranilate:

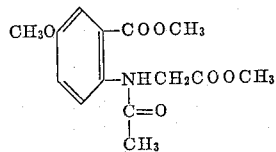

methyl N-acetyl-N-(carbomethoxymethyl)-5-fluoro-anthranilate
methyl N-acetyl-N-(carbomethoxymethyl)-5-methyl-anthranilate
methyl N-acetyl-N-(carbomethoxymethyl)-3-nitro-anthranilate
methyl N-acetyl-N-(carbomethoxymethyl)-4-nitro-anthranilate
methyl N-acetyl-N-(carbomethoxymethyl)-5-nitro-anthranilate
methyl N-acetyl-N-(carbomethoxymethyl)-6-nitro-anthranilate
methyl N-acetyl-N-(carbomethoxyethyl)-5-fluoro-anthranilate
methyl N-acetyl-N-(carbomethoxybenzyl)-5-methyl-anthranilate
methyl N-acetyl-N-(carbomethoxypropyl)-5-methoxy-anthranilate
methyl N-acetyl-N-(carbomethoxyethyl)-4-fluoro-anthranilate
methyl N-acetyl-N-(carbomethoxymethyl)-3-fluoro-anthranilate
methyl N-acetyl-N-(carbomethoxymethyl)-4,5-dichloro-anthranilate
methyl N-acetyl-N-(carbomethoxymethyl)-3,5-dibromo-anthranilate
methyl N-acetyl-N-(carbomethoxymethyl)-5-bromo-6-chloro-anthranilate
methyl N-acetyl-N-(carbomethoxymethyl)-3,5-dimethyl-anthranilate
methyl N-acetyl-N-(carbomethoxymethyl)-5-trifluoromethyl-anthranilate.

Example 2.—Methyl ester of N-acetylindoxylic acid

A cold solution of sodium methoxide prepared from 4.5 g. of sodium and 50 ml. of ethanol is added, with mixing, to a solution of 50 g. of methyl N-acetyl-N-(carbomethoxymethyl)anthranilate in 200 ml. of absolute methanol. The mixture is allowed to stand at about 25° C. for about 20 minutes and acidified with 65 ml. of 20% aqueous acetic acid. The resulting mixture is stirred while adding sufficient water (about 250 ml.) to give a permanently turbid mixture. The desired product separates with continued stirring over a period of several hours (about five hours).

The procedure of this example is used to prepare the indoxylic acid esters of the compounds listed in Example 1.

Example 3.—Indoxylic acid

A total of 2 g. of the methyl ester of N-acetyl-indoxylic acid is added to 55 ml. of 2 N aqueous sodium hydroxide with stirring while maintaining the temperature at about 10° C. The reaction mixture is protected from oxygen by flushing the system with nitrogen before and after adding the acid. The mixture is then refluxed until all of the acid dissolves. Aqueous 2 N hydrochloric acid is added to the reaction mixture to precipitate the desired compound.

The procedure of this example is utilized to prepare substituted indoxylic acids corresponding N-acetylindoxylic acids corresponding N-acetylindoxylic acid esters of the previous example.

Example 4.—t-butyl indoxylate

A mixture containing 20 g. of indoxylic acid and 0.2 g. of p-toluene sulfonic acid in 100 ml. of anhydrous t- butanol and 75 ml. of benzene is refluxed for 15 hours with concurrent slow distillation of the solvent. The mixture was concentrated and filtered to remove the p-toluene sulfonic acid. The balance of the solvent is then removed by low pressure distillation to leave the desired product as a residue.

Other t-butyl esters of the acids prepared in Example 3 are prepared in utilizing the procedure of this example. Other esters including the methyl, ethyl, propyl, isopropyl, n-butyl and pentyl esters are similarly prepared.

Example 5.—Benzyl O-(2-carbo-t-butoxy-3-indolyl) glycolate

To a mixture containing 21.7 g. of t-butyl indoxylate and 19 g. of benzyl chloroacetate in 100 ml. of dry t-butanol there is added with stirring under nitrogen a solution of 6 g. of potassium in 125 ml. of the same solvent. The t-butoxide is dropped in over a period of 2 hours while maintaining the temperature at about 10–15° C. with an ice bath. When addition is complete, the mixture is stirred an additional hour at the same temperature and the solvent removed at low pressure with slight warming. The residue is taken up in ether, washed with water and saturated sodium chloride and finally dried over pressure to leave the desired product as a residue.

The procedure of this example is used to prepare the following compounds starting with the appropriate starting compounds as explained above. Although, for convenience only methyl esters are listed, other esters including ethyl, propyl, phenyl, amyl, nonyl, allyl, p-methoxyphenyl, p-chlorobenzyl, cyclopropylmethyl, cyclohexyl, phenethyl and t-butyl are similarly prepared.

methyl O-(2-carbo-t-butoxy-5-fluoro-3-indolyl) glycolate;
methyl O-(2-carbo-t-butoxy-5 methyl-3 indolyl) glycolate;
methyl O-(2-carbo-t-butoxy-7-nitro-3-indolyl) glycolate;
methyl O-(2-carbo-t-butoxy-6-nitro-3-indolyl) glycolate;
methyl O-(2-carbo-t-butoxy-5-nitro-3-indolyl) glycolate;
methyl O-(2-carbo-t-butoxy-4-nitro-3-indolyl) glycolate;
methyl O-(2-carbo-t-butoxy-5-fluoro-3-indolyl-α-methyl-glycolate;
methyl O-(2-carbo-t-butoxy-5-methyl-3-indolyl)-α-phenyl-glycolate;
methyl O-(2-carbo-t-butoxy-5-methoxy-3-indolyl)-α-ethyl-glycolate;
methyl O-(2-carbo-t-butoxy-6-fluoro-3-indolyl)-α-methyl-glycolate;
methyl O-(2-carbo-t-butoxy-5,6-dichloro-3-indolyl) glycolate;
methyl O-(2-carbo-t-butoxy-5,7-dibromo-3-indolyl) glycolate;
methyl O-(2-carbo-t-butoxy-5-bromo-4-chloro-3-indolyl) glycolate;
methyl O-(2-carbo-t-butoxy-5,7-dimethyl-3-indolyl) glycolate;
methyl O-(2-carbo-t-butoxy-7-trifluoromethyl-3-indolyl) glycolate;
methyl O-(2-carbo-t-butoxymethyl-5-fluoro-3-indolyl) glycolate;
methyl O-(2-carbo-t-butoxyethyl-5-methyl-3-indolyl) glycolate.

Example 6.—Benzyl O-(3-indolyl) glycolate

Benzyl O-(2-carbo-t-butxy-3-indolyl) glycolate (0.005 m.) and 2 g. of fine porous plate chips are intimately mixed and heated in an oil bath under nitrogen until decomposition starts to occur (about 210° C.). Stirring is initiated and the temperature is held fairly constant for about 2 hours. After cooling, the residue is extracted with chloroform, the extracts washed with 2×100 ml. of saturated aqueous sodium bicarbonate, 3×100 ml. of water, dried over anhydrous sodium sulfate, filtered and the chloroform removed in vacuo. Chromatography of the residue on 100 g. of acid-washed alumina using ether-petroleum ether (v./v. 20–100%) gives the desired product.

This procedure is utilized to pyrolyze all of the compounds of the previous example to produce the corresponding compounds with the carbo-t-butoxy group removed.

Example 7.—Benzyl O-[1-(p-chlorobenzoyl)-3-indolyl] glycolate

To an ice cold mixture of benzyl O-(3-indolyl) glycolate (0.01 m.) and 50 ml. of dimethylformamide in a 250 ml. three-necked flask equipped with a stirrer and a nitrogen inlet tube is added 0.012 m. of sodium hydride (50% suspension in mineral oil) and the mixture stirred at about 5° C. under nitrogen for about one-half hour. A total of 0.011 m. of p-chlorobenzoyl chloride is added, and the mixture stirred at about 5° C. for about 16 hours. There is added 100 ml. of ether and the resulting mixture filtered. The filtrate is washed 1×100 ml. water, 3×100 ml. saturated aqueous sodium bicarbonate, 3×100 ml. water, dried over anhydrous sodium sulfate, filtered and the ether removed in vacuo. Chromatography of the residue on a 150 g. acid washed alumina column using ether-petroleum ether (v./v. 20–100%) gives the desired product.

The following compounds are prepared using the procedure of this example. For convenience, they are listed as ethyl esters, but other esters are similarly prepared.

ethyl O-[1-(p-methylthiobenzoyl)-2-methyl-5-methoxy-3-indolyl] glycolate;
ethyl O-[1-(p-chlorobenzoyl)-2-methyl-5-methoxy-3-indolyl] glycolate;
ethyl O-[1-(o-methyl-p-methylthiobenzoyl)-2-methyl-5-methoxy-3-indolyl] glycolate;
ethyl O-[1-benzoyl-2-methyl-5-methoxy-3-indolyl]-α-methyl-glycolate;
ethyl O-[1-(p-chlorobenzoyl)-2-methyl-5-methoxy-3-indolyl]-α-methyl-glycolate;
ethyl O-[1-(p-fluorobenzoyl)-2-methyl-5-methoxy-3-indolyl]-α-methyl-glycolate;
ethyl O-[1-(p-trifluoromethylbenzoyl)-3-indolyl] glycolate;
ethyl O-[1-(p-acetoxybenzoyl)-2-methyl-5-methoxy-3-indolyl] glycolate;
ethyl O-[1-(2-thenoyl)-5-fluoro-3-indolyl] glycoate;
ethyl O-[1-(α-naphthoyl)-5-methyl-3-indolyl] glycolate;
ethyl O-[1-(p-benzyloxybenzoyl)-2-methyl-5-methoxy-3-indolyl] glycolate;
ethyl O-[1-(p-hydroxybenzoyl)-2-methyl-5-fluoro-3-indolyl] glycolate. (This compound is prepared from the corresponding p-benzyloxy compound by catalytic hydrogenation over palladium.)
ethyl O-[1-(β-naphthoyl)-5-methoxy-3-indolyl] glycolate;
ethyl O-[1-(5-chloro-2-thenoyl)-5-fluoro-3-indolyl]-α-methyl-glycolate;
ethyl O-[1-(2,6-dimethoxybenzoyl)-3-indolyl]-α-phenyl-glycolate;
ethyl O-[1-(5-chloro-2-furoyl)-2-methyl-5-methoxy-3-indolyl] glycolate;
ethyl O-[1-(2,5-dimethyl-3-thenoyl)-2-methyl-5-fluoro-3-indolyl] glycolate;
ethyl O-[1-(5-trifluoromethyl-2-furoyl)-2-methyl-5-methoxy-3-indolyl]-α-ethyl-glycolate;
ethyl O-[1-(3,4,5-trimethyl-2-thenoyl)-2-methyl-5-methoxy] glycolate;
ethyl O-[1-(2-methyl-5-bromo-3-furoyl)-3-indolyl]-α-methyl-glycolate;
ethyl O-[1-(5-phenyl-2-thenoyl)-2-methyl-3-indolyl] glycolate;
ethyl O-[1-(4-bromo-3-thenoyl)-2-methyl-7-nitro-3-indolyl] glycolate.

Example 8.—Ethyl-O-[1-(1-methyl-2-pyrrolylcarbonyl)-2-methyl-5-methoxy-3-indolyl] glycolate (A) p-Nitrophenyl-1-methyl-pyrrole-2-carboxylate.—
In a 500 ml. round bottom flask (all equipment flame dried) is added 13.9 g. of p-nitrophenol and 3.7 g. of 1-methyl-pyrrole-2-carboxylic acid in 250 ml. of dry tetrahydrofuran. Through a dropping funnel is added over 30 minutes, 20.6 g. of dicyclohexylcarbodiimide in 100 ml. of dry tetrahydrofuran. The reaction is allowed to run about 16 hours with stirring. The dicyclohexyl urea which forms is removed by filtration. The filter cake is washed with dry tetrahydrofurane. The combined filtrate and washings are evaporated to dryness and the residual solid taken up in benzene. The benzene solution is washed with sodium bicarbonate solution and then with water. It is dried over anhydrous sodium sulfate, filtered and concentrated to dryness. The solid p-nitrophenyl-1-methylpyrrole-2-carboxylate is then recrystallized from benzene.

In a 250 ml. round bottom flask (flame dried equipment) is placed at 0° C. under nitrogen, 100 ml. of dry dimethylformamide with 10 g. of ethyl O-(2-methyl-5-methoxy-3-indolyl) glycolate. To this is added 2.5 g. of 50% sodium hydride mineral oil mixture. After the mixture is stirred for 30 minutes, there is added over 15 minutes a solution of 4.9 g. of p-nitrophenyl-1-methyl-pyrrole-2-carboxylate in 50 ml. of dry dimethylformamide. The reaction mixture is stirred for 4 hours at 0° C. under nitrogen followed by stirring at room temperature for about 16 hours. The reaction mixture is then poured into an ice-water-ether solution containing a few ml. of acetic acid and the layers are separated. The aqueous phase is washed with ether and the ether extracts combined. A saturated solution of hydrogen chloride gas in dry ether is added to the ether layers and the ether decanted to leave a heavy oil. The oil is washed with ether followed by addition of aqueous sodium bicarbonate solution. The product is then extracted with ether. The ether layer is dried over anhydrous sodium sulfate and concentrated to dryness to leave the desired product as a residue.

The process of this example is used to prepare the following compounds except that in the case of neutral compounds precipitation with hydrogen chloride and subsequent neutralization is omitted:

ethyl O-[1-(3,4,5-trimethoxybenzoyl)-5-nitro-3-indolyl] glycolate;
ethyl O-[-(p-phenoxybenzoyl)-2-methyl-3-indolyl] methyl-glycolate;
ethyl O-[1-(p-trifluoroacetylbenzoyl)-2-ethyl-5-fluoro-3-indolyl]-α-phenyl-glycolate;
ethyl O-[1-(p-N,N-dimethylsulfamylbenzoyl)-2-methyl-5-ethoxy-3-indolyl] glycolate;
ethyl O-[1-nicotinoyl-2-methyl-5-methoxy-3-indolyl] glycolate;
ethyl O-[1-(6-chloronicotinoyl)-2-methyl-3-indolyl] glycolate;
ethyl O-[1-(2-methyl-5-iodoisonicotinoyl)-3-indolyl]-α-methyl-glycolate;
ethyl O-[1-(6-chloroquinaldoyl)-2-methyl-3-indolyl] glycolate;
ethyl O-[1-(5-cyano-6-methyl-2-trifluoromethyl-nicotinoyl)-3-indolyl] glycolate;
ethyl O-[1-(2-0-fluorophenyl-4-quinolylcarbonyl)-2-methyl-3-indolyl] glycolate;
ethyl O-[1-(1-isoquinoylcarbonyl)-2-methyl-5-methoxy-3-indolyl] glycolate;
ethyl O-[1-picolinoyl-2-methyl-7-trifluoromethyl-3-indolyl] glycolate;
ethyl O-[1-(2-benzylthioisonicotinoyl)-3-indolyl] glycolate;
ethyl O-[1-(5-chloro-2-thiazolylcarbonyl)-2-methyl-5-methoxy-3-indolyl] glycolate;
ethyl O-[1-(4-thiazolylcarbonyl)-2-methyl-5-methoxy-3-indolyl] glycolate;
ethyl O-[1-(1-pyrazolylcarbonyl)-3-indolyl]-α-ethyl-glycolate;
ethyl O-[1-(2-benzyl-5-chloro-4-oxazolylcarbonyl)-2-methyl-5-methoxy-3-indolyl] glycolate;
ethyl O-[1-(2-methyl-5-trifluoromethyl-4-oxazolylcarbonyl)-2-ethyl-6-fluoro-3-indolyl]-α-methyl-glycolate;
ethyl O-[1-(2-methylthio-5-methyl-1-imidazolylcarbonyl)-3-indolyl] glycolate;
ethyl O-[1-(1-benzoyl-5-bromo-4-imidazolylcarbonyl)-2-methyl-5,7-dibromo-3-indolyl] glycolate;
ethyl O-[1-(2-bromo-4-thiazolylcarbonyl)-3-indolyl]-α-propyl-glycolate;
ethyl O-[1-(5-phthalamido-2-thiazolylcarbonyl)-2-methyl-5-methoxy-3-indolyl] glycolate;
ethyl O-[1-(4-methyl-4-morpholinothio-5-thiazolylcarbonyl)-2,5,7-trimethyl-3-indolyl] glycolate;
ethyl O-[1-(3-methyl-5-isothiazolylcarbonyl)-3-indolyl]-α-phenyl-glycolate;
ethyl O-[1-(4-1,2,3-thiadiazolylcarbonyl)-2-methyl-5-ethoxy-3-indolyl] glycolate;
ethyl O-[1-(5-phenyl-4-1,2,3-thiadiazolylcarbonyl)-2-methyl-5,6-dichloro-3-indolyl]-α-methyl-glycolate;
ethyl O-[1-(1-phenyl-3-pyrazolylcarbonyl)-2-methyl-5-methoxy-3-indolyl] glycolate;
ethyl O-[1-(1,3,5-trimethyl-4-pyrazolylcarbonyl)-3-indolyl] glycolate;
ethyl O-[1-coumariloyl-2-methyl-5-methoxy-3-indolyl] glycolate;
ethyl O-[1-(2-benzimidazolylcarbonyl)-2-methyl-5-methoxy-3-indolyl] glycolate;
ethyl O-[1-(2-methyl-7-nitro-5-benzimidazolylcarbonyl)-3-indolyl] glycolate;
ethyl O-[1-(6-fluoro-2-indolylcarbonyl)-3-indolyl]-α-methyl-glycolate;
ethyl O-[1-(3-indazolylcarbonyl)-2-ethyl-5-methoxy-3-indolyl] glycolate;
ethyl O-[1-(4-benzofuroylcarbonyl)-2-methyl-5-methoxy-3-indolyl]-α-methyl-glycolate;
ethyl O-[1-(2-methyl-5-benzothiazolylcarbonyl)-2-methyl-5-fluoro-3-indolyl] glycolate;
ethyl O-[1-(3-benzisoxazolylcarbonyl)-2-methyl-5-methoxy-3-indolyl] glycolate;
ethyl O-[1-(5-benzoxazolylcarbonyl)-2-methyl-5-nitro-3-indolyl] glycolate;
ethyl O-[1-(2-ethyl-2,3-dihydro-7-thianaphthylcarbonyl)-2-methyl-5-nitro-3-indolyl] glycolate;
ethyl O-[1-(6-nitro-6-isoindazolylcarbonyl)-6-fluoro-3-indolyl] glycolate;
ethyl O-[1-(2-benzisoxazolylcarbonyl)-6-fluoro-3-indolyl] glycolate;
ethyl O-[1-(2-benzothiophenylcarbonyl)-5-nitro-3-indolyl] glycolate;
ethyl O-[1-(5-purimidylcarbonyl)-2-methyl-5-methoxy-3-indolyl] glycolate;
ethyl O-[1-(3-pyridazinylcarbonyl)-2-methyl-5-methoxy-3-indolyl] glycolate;
ethyl O-[1-(2-benzylmercapto-4-chloro-5-pyrimidylcarbonyl)-2-methyl-5-methoxy-3-indolyl]-α-ethyl-glycolate;
ethyl O-[1-(morpholinomethyl-2-phenyl-5-pyrimidylcarbonyl)-3-indolyl] glycolate;
ethyl O-[1-(6-chloro-3-pyridazinylcarbonyl)-2-propyl-3-indolyl] glycolate;
ethyl O-[1-(6-methylpyrazinoyl)-2-methyl-5-methoxy-3-indolyl] glycolate.

Example 9.—2-methyl-3-hydroxy-5-methoxy indoline

A total of 7.1 g. of 2-methyl-5-methoxyindoxyl is taken up in 100 ml. of methanol and 50 ml. of methanol containing .41 g. of sodium borohydride slowly added while maintaining the temperature at about 25° C. The mixture is then stirred an additional 15 minutes and a few drops of acetic acid added. The solvent is removed in vacuo and the residue taken up in chloroform. The organic solution is filtered, dried over anhydrous sodium sulfate, filtered and the solvent removed in vacuo to leave the desired product as a residue.

The 2-methyl-5-methyl-indoxyl used in this example is prepared from t-butyl indoxylic acid prepared from the product of Example 4 using the pyrolysis procedure of Example 6.

This procedure is utilized to prepare the following compounds from starting materials prepared using the processes of Examples 4 and 6:

2-methyl-3-hydroxy-5-fluoroindoline;
2-ethyl-3-hydroxy-5-methyl indoline;
3-hydroxy-5-methyl indoline;
2-propyl-3-hydroxy-5-methoxy indoline;
2-ethyl-3-hydroxy-5-ethoxy indoline.

Example 10.—1-p-(chlorobenzoyl)-2-methyl-3-hydroxy-5-methoxy-indoline

To an ice-cooled mixture of 2-methyl-3-hydroxy-5-methoxy-indoline (0.01 m.) and 25 ml. of dry pyridine is added 1.74 g. (0.01 m.) of p-chlorobenzoyl chloride and the mixture stirred for about 1.5 hours while retaining the temperature at about 10° C. A total of 150 ml. of ethyl acetate is added and the resulting mixture washed with 2× 100 ml. water, 2× 50 ml. saturated sodium bicarbonate solution and 2× 50 ml. water. It is then dried over anhydrous sodium sulfate, filtered and the solvent removed in vacuo. The residue is chromatographed on a 100 g. silica gel column using ether-petroleum ether (v./v. 0–50%) systems as eluents to yield the desired compound.

This procedure is utilized to prepare the following compounds:

1-benzoyl-2-methyl-3-hydroxy-5-methoxy-indoline;
1-(p-fluorobenzoyl)-2-methyl-3-hydroxy-5-methoxy indoline;
1-(p-trifluoromethylbenzoyl)-3-hydroxy-indoline;
1-(p-acetoxybenzoyl)-2-methyl-3-hydroxy-5-methoxy indoline;
1-(2-thenoyl)-3-hydroxy-5-fluoro-indoline;
1-(α-naphthoyl)-3-hydroxy-5-methyl-indoline;
1-(p-benzyloxybenzoyl)-3-hydroxy-indoline;
1-(p-hydroxybenzoyl)-2-methyl-3-hydroxy-5-fluoro-indoline;
1-(β-naphthoyl)-3-hydroxy-5-methoxy-indoline;
1-(5-chloro-2-thenoyl)-3-hydroxy-indoline;
1-(2,6-dimethoxybenzoyl)-3-hydroxy-indoline;
1-(5-chloro-2-furoyl)-2-methyl-3-hydroxy-5-methoxy-indoline;
1-(2,5-dimethyl-3-thenoyl)-2-methyl-3-hydroxy-5-methoxy-indoline;
1-(5-trifluoromethyl-2-furoyl)-2-methyl-3-hydroxy-5-methoxy-indoline;
1-(3,4,5-trimethyl-2-thenoyl)-2-methyl-3-hydroxy-5-methoxy-indoline;
1-(2-methyl-5-bromo-3-furoyl)-3-hydroxy-indoline;
1-(5-phenyl-2-thenoyl)-2-methyl-3-hydroxy-indoline;
1-(4-bromo-3-thenoyl)-2-methyl-3-hydroxy-7-nitro-indoline;
1-nicotinoyl-2-methyl-3-hydroxy-5-methoxy-indoline;
1-(6-chloronicotinoyl)-2-methyl-3-hydroxy-indoline;
1-(2-methyl-5-iodisonicotinoyl)-3-hydroxy-indoline;
1-(6-chloroquinaldoyl)-2-methyl-3-hydroxy-indoline;
1-(5-cyano-6-methyl-2-trifluoromethylnicotinoyl)-2-hydroxy-indoline;
1-[2-(o-fluorophenyl)quinolinoyl]-2-methyl-3-hydroxy-indoline;
1-picolinoyl-2-methyl-3-hydroxy-7-trifluoromethyl indoline;
1-(2-benzylthioisonicotinoyl)-3-hydroxy-indoline;
1-(5-chloro-2-thiazolylcarbonyl)-2-methyl-3-hydroxy-5-methoxy-indoline;
1-(4-thiazolylcarbonyl)-2-methyl-3-hydroxy-5-methoxy-indoline;
1-(1-pyrazolylcarbonyl)-3-hydroxy-indoline;
1-(2-benzyl-5-chloro-4-oxazolylcarbonyl)-2-methyl-3-hydroxy-5-methoxy-indoline;
1-(2-methyl-5-trifluoromethyl-4-oxazolylcarbonyl)-2-ethyl-3-hydroxy-6-fluoro-indoline;
1-(2-methylthio-5-methyl-2-imidazolylcarbonyl)-3-hydroxy-indoline;
1-(1-benzoyl-5-bromo-4-imidazolylcarbonyl)-2-methyl-3-hydroxy-5,7-dibromo-indoline;
1-(2-bromo-4-thiazolylcarbonyl)-3-hydroxy-indoline;
1-(5-phthalamido-2-thiazolylcarbonyl)-2-methyl-3-hydroxy-5-methoxy-indoline;
1-(4-methyl-4-morpholinothio-5-thiazolylcarbonyl)-2,5,7-trimethyl-3-hydroxy-indoline;
1-(3-methyl-5-isothiazolylcarbonyl)-3-hydroxy-indoline;
1-(4-1,2,3-thiadiazolylcarbonyl)-2-methyl-3-hydroxy-5-ethoxy-indoline;
1-(5-phenyl-4-1,2,3-thiadiazolylcarbonyl)-2-methyl-3-hydroxy-5,6-dichloro-indoline;
1-(1-phenyl-3-pyrazolylcarbonyl)-2-methyl-3-hydroxy-5-methoxy-indoline;
1-(1,3,5-trimethyl-4-pyrazolylcarbonyl)-3-hydroxy-indoline;
1-coumariloyl-2-methyl-3-hydroxy-5-methoxy-indoline;
1-(2-benzimidozolylcarbonyl)-2-methyl-3-hydroxy-5-methoxy-indoline;
1-(2-methyl-7-nitro-5-benzimidazolylcarbonyl)-3-hydroxy-indoline;
1-(6-fluoro-2-indolylcarbonyl)-3-hydroxy-indoline;
1-(3-indazolylcarbonyl)-2-ethyl-3-hydroxy-5-methoxy-indoline;
1-(4-benzofuroylcarbonyl)-2-methyl-3-hydroxy-5-methoxy-indoline;
1-(2-methyl-5-benzothiazolylcarbonyl)-2-methyl-3-hydroxy-5-fluoro-indoline;
1-(3-benzisoxazolylcarbonyl)-2-methyl-3-hydroxy-5-methoxy-indoline;
1-(5-benzoxazolylcarbonyl)-2-methyl-3-hydroxy-5-nitro-indoline;
1-(6-nitro-6-isoindazolylcarbonyl)-6-fluoro-3-hydroxy-indoline;
1-(2-benzisoxazolylcarbonyl)-6-fluoro-3-hydroxy-indoline;
1-(2-benzothiophenylcarbonyl)-5-nitro-3-hydroxy-indoline;
1-(5-pyrimidylcarbonyl)-2-methyl-3-hydroxy-5-methoxy-indoline;
1-(3-pyridazinylcarbonyl)-2-methyl-3-hydroxy-5-methoxy-indoline;
1-(benzylmercapto-4-chloro-5-pyrimidylcarbonyl)-2-methyl-3-hydroxy-5-methoxy-indoline;
1-(morpholinomethyl-2-phenyl-5-pyrimidylcarbonyl)-3-hydroxy-indoline;
1-(6-chloro-3-pyridazinylcarbonyl)-2-propyl-3-hydroxy-indoline;
1-(6-methylpyrazinoyl)-2-methyl-3-hydroxy-5-fluoro-indoline;
1-(1-methyl-2-pyrrolylcarbonyl)-2-methyl-3-hydroxy-5-methoxy-indoline;
1-(3,4,5-trimethoxybenzoyl)-3-hydroxy-5-nitro-indoline;
1-(p-phenoxybenzoyl)-2-methyl-3-hydroxy-indoline;
1-(p-trifluoroacetylbenzoyl)-2-ethyl-3-hydroxy-5-fluoro-indoline;
1-(p-N,N-dimethylsulfamylbenzoyl)-2-methyl-3-hydroxy-5-ethoxy-indoline.

Example 11.—t-Butyl O-[1-(p-chlorobenzoyl)-2-methyl-5-methoxy-3-indolinyl] glycolate This compound is prepared from 1-(p-chlorobenzoyl)-2-methyl-3-hydroxy-5-methoxy-indoline and t-butyl chloroacetate using the procedure of Example 7.

Using this precedure t-butyl esters of each of the compounds prepared in the previous example are prepared as other esters such as methyl, ethyl, propyl, n-butyl, amyl, cyclohexyl, benzyl, p-chlorobenzyl and β-ethyethyl.

In addition the procedure is utilized to prepare the α-methyl and α-phenyl analogs of each of the foregoing compounds by utilizing α-chloro-α-methyl-acetates and α-chloro-α-phenyl-acetates as starting materials. The following compounds are mentioned by way of example:

methyl O-[1-(p-chlorobenzoyl)-2-methyl-5-methoxy-3-indolinoyl]-α-phenyl-glycolate;
methyl O-[1-(p-methylthiobenzoyl)-2-methyl-5-methoxy-3-indolinoyl]-α-methyl glycolate.

Example 12.—t-butyl O-[1-(p-chlorobenzoyl)-2-methyl-5-methoxy-3-indolyl] glycolate A mixture containing 3 g. of t-butyl O-[1-(p-chlorobenzoyl)-2-methyl-5-methoxy-3-indolinyl] glycolate and an equal amount of 5% palladium on carbon in 100 ml. of xylene is refluxed for 8 hours. At the end of this period the catalyst is removed by filtration and the solvent evaporated to leave the desired product as a residue.

This procedure is utilized to oxidize each of the products prepared in accordance with the process of the preceding example.

Example 13.—O-[1-(p-chlorobenzoyl)-2-methyl-5-methoxy-3-indolyl] glycolic acid

This compound is prepared from the t-butyl ester prepared in accordance with the procedure of Example 12 using the pyrolysis procedure of Example 6. The procedure is also used to prepare the free acids of the other t-butyl esters of Example 12.

Example 14.—O-[1-(p-trifluoromethylbenzoyl)-2-methyl-5-methoxy-3-indolyl] glycolic acid A mixture containing 1.5 g. of benzyl O-[1-(p-trifluoromethylbenzoyl)-2-methyl-5-methoxy-3-indolyl] glycolate, a drop of acetic acid and palladium on charcoal catalyst in 20 ml. of ethyl acetate is prepared. Hydrogen is bubbled through the mixture at standard pressure and about 25° C. until reduction is complete. The catalyst is removed by filtration and the desired product recovered by removal of the solvent in vacuo. Each of the benzyl esters prepared in accordance with Example 11 is similarly hydrogenated to yield the corresponding acid.

Example 15.—1-bromo-1(5-methoxy-2-nitrophenyl)-2-propanone

To a solution of 0.1 m. of 1-(5-methoxy-2-nitrophenyl)-2-propanone in 300 ml. of acetic acid is added dropwise 0.105 m. of bromine with stirring while maintaining the temperature at about 10° C. After addition is complete, the mixture is stirred for an additional hour at about the same temperature and then at about 25° C. for one more hour. The mixture is poured into ice water and extracted with chloroform. The chloroform solution is washed with water, dried over anhydrous sodium sulfate, filtered and evaporated in vacuo at about 25° C. to yield the desired product.

The same procedure is utilized to prepare:

1-bromo-1-(5-methoxy-2-nitrophenyl)-2-butanone, and
1-bromo-1-(5-methoxy-2-nitrophenyl)-2-pentanone utilizing the corresponding debromo-2-butanone and 2-pentanone respectively.

Example 16.—1-(5-methoxy-2-nitrophenyl)-1-(methoxycarbonylmethoxy)-2-propanone

The product of the previous example (0.1 m.) is dissolved in 1,2-dimethoxyethane and added slowly to a mixture of 0.1 m. of potassium t-butoxide and 0.1 m. of methyl glycolate in 200 ml. dimethoxyethane with stirring at about 5° C. After 2 hours at this temperature the mixture is poured into ice water and extracted with ether. The ethereal solution is washed with water, dried over anhydrous sodium sulfate, filtered and the solvent removed in vacuo to leave the desired product as a residue. The crude product is chromatographed on a column of silica gel using ethyl acetate as eluent.

The same procedure is used to prepare:

1-(5-methoxy-2-nitrophenyl)-1-(methoxycarbonylmethoxy)-2-butanone and
1-(5-methoxy-2-nitrophenyl)-1-(methoxycarbonylmethoxy)-2-pentanone.

Example 17.—Methyl O-(2-methyl-5-methoxy) glycolate

A solution of 0.02 m. of the product of the previous example in 100 ml. of methanol is reduced catalytically at 40 p.s.i. in the presence of Raney nickel catalyst. The solution is filtered, evaporated in vacuo and chromatographed on a column of 200 g. acid washed alumina using ether-benzene as eluent.

The same procedure is used to prepare:

methyl O-(2-ethyl-5-methoxy) glycolate and
methyl O-(2-propyl-5-methoxy) glycolate using the butanone and pentanone prepared in Example 16 as starting materials.

Example 18.—Methyl O-[1-(p-chlorobenzoyl)-2-propyl-5-methoxy-3-indolyl] glycolate This compound is prepared from the corresponding 2-propyl compound of the previous example using the process of Example 7.

Example 19.—Methyl O-[1-(p-chlorobenzoyl)-2-methyl-5-(1-pyrrolidino)-3-indolyl] glycolate A mixture containing 1 g. of methyl O-[1-(p-chlorobenzoyl)-2-methyl-5-amino-3-indolyl] glycolate, 0.9 g. of 1,4-dibromobutane and 0.98 g. of anhydrous sodium carbonate in 80 ml. of ethanol is stirred under reflux in a nitrogen atmosphere for 6 hours. The reaction mixture is then filtered and the filtrate is concentrated in vacuo to a small volume and diluted with ether. This solution is then washed twice with water, dried over anhydrous sodium sulfate and concentrated in vacuo to dryness. The product is chromatographed over silica gel using ether-petroleum ether as eluents.

When ethylene dibromide is used instead of dibromobutane the product obtained is substituted at the 5-position with a 1-azacyclopropyl group.

This procedure is used to prepare other 5-(1-pyrrolidino) and 5-(1-azacyclopropyl) substituted compounds of this invention utilizing the 5-amino substituted (3-indolyl)glycolic acid derivatives prepared in accordance with the herein examples.

Example 20.—Ethyl O-[1-(p-chlorobenzoyl)-2-methyl-5-dimethylamino-3-indolyl] glycolate To a solution of 0.4 g. of ethyl O-[1-(p-chlorobenzoyl)-2-methyl-5-nitro-3-indolyl] glycolate in 20 ml. of distilled dimethoxyethane is added 1.5 ml. of glacial acetic acid and 0.5 ml. of a 37% solution of aqueous formaldehyde. This mixture is reduced with Raney nickel at 40 p.s.i. and about 25° C. After reaction is complete the mixture is filtered, concentrated in vacuo to a small volume and diluted with ether. The ether solution is washed with water, aqueous sodium bicarbonate, again with water, dried over anhydrous sodium sulfate, filtered and the solvent removed in vacuo to leave the desired product as a residue.

Other dimethylamino-substituted compounds of this invention are similarly prepared from the nitro substituted (3-indolyl)-glycolic acid derivatives prepared in accordance with the herein examples.

Example 21.—Methyl O-[1-(p-chlorobenzoyl)-2-methyl-5-acetamino-3-indolyl] glycolate To a solution of 0.4 g. of methyl O-[1-(p-chlorobenzoyl)-2-methyl-5-nitro-3-indolyl] glycolate in 30 ml. of anhydrous ethyl acetate is added 0.31 g. of acetic anhydride. The mixture is reduced with Raney nickel at 40 p.s.i. at about 25° C. When the reaction is complete, the catalyst is removed by filtration and the product isolated using the technique of the previous example.

Other acetamino substituted compounds of this invention are similarly prepared from the nitro substituted (3-indolyl)-glycolic acid derivatives prepared in accordance with the herein examples.

Example 22.—Methyl O-[1-(p-chlorobenzoyl)-2-methyl-5-amino-3-indolyl] glycolate

A total of 0.03 m. of methyl O-[-1-(p-chlorobenzoyl)-2-methyl-5-nitro-3-indolyl] glycolate in 100 ml. of ethanol is hydrogenated in the presence of 120 mg. of 10% palladium on charcoal catalyst at 40 p.s.i. at about 25° C. When the reaction is complete as measured by the uptake of hydrogen the catalyst is removed by filtration and the product recovered utilizing the procedure of Example 20.

Other amino substituted compounds of this invention are similarly prepared from the nitro substituted (3-indolyl)glycolic acid derivatives prepared in accordance with the herein examples.

Example 23.—Methyl O-[1-(p-chlorobenzoyl)-2-methyl-5-methylamino-3-indolyl] glycolate A mixture of 1.1 mole of carbobenzyloxy chloride, 500 ml. of pyridine and 1.0 mole of methyl O-[1-(p-chlorobenzoyl)-2-methyl-5-amino-3-indolyl] glycolate is stirred at room temperature for four hours. It is then poured into water and the 5-carbobenzyloxyamino indolyl compound is filtered, washed and dried.

The 5-carbobenzyloxyamino indolyl compound is then added to a suspension of sodium hydride in dimethylformamide with stirring and ice-cooling. After one hour, excess methyl iodide is added and the mixture stirred for about 16 hours. The reaction mixture is poured into ice water and extracted with ether. Evaporation of the ethereal solution and chromatography of the residue on an alumina column using ether-petroleum ether eluents gives methyl O-[1-(p-chlorobenzoyl)-2-methyl-5-(N-methyl-carbobenzyloxyamino)-3-indolyl] glycolate.

The product is subjected to hydrogenation at atmospheric pressure over palladium on charcoal in ether solution. The mixture is then filtered to remove the catalyst. Evaporation of the solvent gives the desired product.

Example 24

(A) Methyl O-[1-(p-chlorobenzoyl)-2-methyl-5-bis (β-hydroxyethyl)amino-3-indolyl] glycolate.—A mixture of 0.02 mole of methyl O-[1-(p-chlorobenzoyl)-2-methyl-5-amino-3-indolyl] glycolate, 0.044 mole of ethylene oxide and 0.03 mole of acetic acid in 300 ml. dimethoxyethane is heated to 100° C. for 18 hours in an autoclave. The mixture is then diluted with water and filtered to yield crude methyl O-[1-(p-chlorobenzoyl)-2-methyl-5-bis(β-hydroxyethyl)amino-3-indolyl] glycolate.

When an equivalent amount of propylene oxide is used in the above procedure in place of the ethylene oxide, there is obtained methyl O-[1-(p-chlorobenzoyl)-2-methyl-5-bis(hydroxypropyl)amino-3-indolyl] glycolate.

(B) Methyl O-[1-(p-chlorobenzoyl)-2-methyl-5-(4'-methyl-1'-piperazinyl-3-indolyl] glycolate.—The product of A is stirred at 0° C. in pyridine with two mole proportions of p-toluenesulfonyl chloride until the reaction is substantially complete. The mixture is poured into water and the 5-bis(p-toluene-sulfonyloxyethyl)amino compounds are isolated. This is dissolved in benzene and one mole proportion of methylamine is added. The mixture is allowed to stand at room temperature for 3 days. The mixture is poured into iced water containing two equivalents of sodium carbonate and extracted with ether immediately. Evaporation of the ether yields methyl O-[1-(p-chlorobenzoyl)-2-methyl-5-(4'-methyl-1'-piperazinyl)-3-indolyl] glycolate.

Example 25.—Methyl O-[1-(p-chlorobenzoyl)-2-methyl-5-(4'-morpholinyl)-3-indolyl] glycolate A solution of tosyl chloride (0.1 mole) in 200 ml. benzene is added dropwise with stirring to a solution of methyl O-[1-(p-chlorobenzoyl)-2-methyl-5-bis(β-hydroxyethyl)amino-3-indolyl] glycolate (0.1 mole) and pyridine (0.3 mole) in 300 ml. benzene at room temperature over a period of one hour. The mixture is then heated under reflux of 3 hours, washed with water, dried over sodium sulfate and evaported to a syrup. Chromatography of the syrup on alumina column using 30–50% (v./v.) ether in petroleum ether as the eluent gives methyl O-[1-(p-chlorobenzoyl)-2-methyl-5-(4'-morpholinyl)-3-indolyl] glycolate.

Example 26

(A) Methyl O-[1-(p-chlorobenzoyl)-2-methyl-5-cyano-3-indolyl] glycolate.—Acylation of methyl O-(2-methyl-5-cyano-3-indolyl) glycolate in dimethylformamide with sodium hydride and p-chlorobenzoyl chloride, by the procedure of Example 7, gives methyl O-[1-(p-chlorobenzoyl)-2-methyl-5-cyano-3-indolyl] glycolate.

(B) Methyl O-[1-(1-p-chlorobenzoyl)-2-methyl-5-aminomethyl-3-indolyl] glycolate.—The 5-cyano ester prepared in Example 26A is hydrogenated in ethanol in the presence of Raney nickel and 3 moles of anhydrous ammonia at 2000 p.s.i. at room temperature to give, after filtration of the catalyst and evaporation of the reaction mixture, methyl O-[1-(p-chlorobenzoyl)-2-methyl-5-aminomethyl-3-indolyl]glycolate which can be recrystalized from aqueous ethanol as its hydrochloride.

(C) Methyl O-[1-(p-chlorobenzoyl)-2-methyl-5-dimethyl-aminomethyl-3-indolyl] glycolate.—Treatment of the above α-aminomethyl indole with 2 moles of methyl iodide gives the 5-dimethylaminomethyl derivative. When ethyliodide is used in place of methyl iodide, the 5-diethylaminomethyl derivative is obtained.

Example 27.—1-(p-chlorobenzoyl-2-methyl-5-methoxy-3-indolyl) glycolic acid anhydride Dicyclohexylcarbodiimide (0.05 m.) is dissolved in a solution of 0.1 m. O-[1-(p-chlorobenzoyl)-2-methyl-5-methoxy-3-indolyl] glycolic acid (prepared by pyrolysis of the corresponding t-butyl ester) in 200 ml. of tetrahydrofuran, and the solution is allowed to stand at about 25° C. for 2 hours. The precipitated urea is removed by filtration, and the filtrate evaporated in vacuo to leave the desired product as a residue.

Other anhydrides of this invention are similarly prepared from the corresponding free acids prepared in accordance with the herein examples.

Example 28.—Aluminum salt of 1-(p-chlorobenzoyl)-2-methyl-5-methoxy-3-indolyl glycolic acid A total of 0.02 m. of 1-(p-chlorobenzoyl)-2-methyl-5-methoxy-3-indolyl glycolic acid is added to 5-ml. of water which has been flushed with nitrogen. The slurry is stirred under nitrogen and 20 ml. of 1.05 N sodium carbonate added with stirring. When a clear solution is obtained, a solution of 2.2 g. of aluminum sulfate octadecahydrate in 8 ml. of water is added with vigorous stirring. The mixture is stirred until it is homogeneous and the solid aluminum salt is recovered by filtration and washed with water and with ethanol.

Other sodium, potassium, magnesium and aluminum salts of this invention are similarly prepared from the corresponding free acids prepared in accordance with the herein examples.

Example 29.—1-(-chlorobenzoyl)-2-methyl-5-methoxy-3-indolyl-glycolamide

Isobutylchloroformate (0.007 ml.) is added to an ice cold nitrogen blanketed solution of 1-(p-chlorobenzoyl)-2-methyl-5-methoxy-3-indolyl-glycolic acid (0.007 m.) and an equimolar quantity of triethylamine in 40 ml. of anhydrous 1,2-dimethoxymethane. After stirring in the cold for 20 minutes, the mixture is filtered, and the filtrate immediately placed in a nitrogen atmosphere again.

The filtrate is taken up in 10 ml. of 1,2-dimethoxymethane and ammonia gas slowly bubbled through with stirring at about 5° C. over a period of about 10 hours. The solvent is then removed in vacuo to leave the desired product as a residue.

Amides of other compounds of this invention are similarly prepared from the corresponding free acids prepared in accordance with the herein examples.

Example 30.—1 - (p-chlorobenzoyl)-2-methyl-5-methoxy-3-indolyl-glycolic acid

To a solution of 2.3 g. of the product of the previous example in 50 ml. of dimethoxyethane containing 1 ml. of 12 N hydrochloric acid at 0° C. is added 0.7 g. of sodium nitrite with stirring. After gas evolution has subsided the mixture is poured into 200 ml. of ice water and the precipitate extracted with methylene chloride. The methylene chloride solution is extracted with aqueous sodium bicarbonate and the desired product precipitated by acidification of the solution with 2 N hydrochloric acid. It is recovered by filtration.

Example 31.—1 - (p-chlorobenzoyl)-2-methyl-5-methoxy-3-indolyl-glycolic acid morpholide Isobutylchloroformate (0.07 m.) is added to an ice-cooled nitrogen blanketed solution of 1-(p-chlorobenzyl)-2-methyl-5-methoxy-2-indolyl-glycolic acid (0.07 m.) and an equivalent quantity of triethylamine in 40 ml. of anhydrous methoxyethane. After stirring for 20 minutes at about 5° C., the mixture is filtered, and the filtrate immediately ice-cooled and placed in a nitrogen atmosphere.

Morpholine (0.008 m.) in 10 ml. of dimethoxyethane is then added, and the mixture stirred at about 5° C. for about 16 hours. The solvent is removed in vacuo to leave the desired product as a residue. It is purified by recrystallization from benzene-petroleum ether.

The use of equivalent amounts of dimethylamine, ethanolamine, benzylamine, and N,N-diethyl-ethylenediamine in place of morpholine gives:

N,N - dimethyl-1-(p-chlorobenzoyl)-2-methyl-5-methoxy-3-indolyl-glycolamide

N - (β - hydroxyethyl)-1-(p-chlorobenzoyl)-2-methyl-5-methoxy-3-indolyl-glycolamide N - benzyl - 1-(p-chlorobenzoyl)-2-methyl-5-methoxy-3-indolyl-glycolamide N - (β-N',N'-diethylamino)ethyl-1-(p-chlorobenzoyl)-2-methyl-5-methoxy-3-indolyl-glycolamide.

Replacement of morpholine with an equivalent quantity of piperidine, pyrrolidine, N-methylpiperazine, N-phenylpiperazine, N-hydroxyethylpiperazine, piperazine, diethylamine, diethanolamine, aniline, p-ethoxyaniline, p-chloroaniline, p-trifluoromethylaniline, butylamine, cyclohexylamine, methylamine, D-glucosamine, tetra-O-acetyl-D-glucosamine, D-glycosylamine, D-galactosylamine, D-mannosylamine, N,N - dimethylglycine amide, N,N - dibutyl-glycine amide, N-methyl-2-aminomethyl-piperidine, N - methyl-2-aminomethylpyrrolidine, N-methyl-3-aminopiperidine, N-methyl-3-aminopyrrolidine, β-ethoxyethylamino, di(β-ethoxyethyl) amine, benzylamine, β-phenethylamine, α-phenethylamine, dibenzylamine or D-mannosamine affords the corresponding glycolamides.

Other amides corresponding to the foregoing amides within the scope of this invention are similarly prepared from the free acids prepared in accordance with the herein examples.

Example 32.—Methyl O-[1-(p-chlorobenzoyl)-2-methyl-5-allyloxy-3-indolyl] glycolate (A) Methyl 2-methyl-5-allyloxy-3-indolyl glycolate.—A mixture of 3.4 g. of methyl-5-hydroxy-2-methyl-3-indolyl glycolate prepared by reduction of the corresponding 5-benzyloxy compound with palladium on carbon in ethanol, 2.4 g. of allylbromide and 7.5 g. of potassium carbonate is stirred at room temperature to 56° C. for 8 to 16 hours. The reaction mixture is filtered, concentrated in vacuo and chromatographed on 60 g. of silica gel, using v./v. 50% ether in petroleum ether as eluent to give the desired product.

(B) Methyl O - [1-(p-chlorobenzoyl)-2-methyl-5-allyloxy-3-indolyl] glycolate.—The procedure of Example 7 is followed, using the above 5-allyloxy compound in place of the 5-methoxy compound to give the desired compound.

Similarly when allyl bromide is replaced by an equivalent amount of cyclopropylmethyl bromide, cyclobutylmethyl bromide, and isopropyl bromide, the corresponding 5-cyclopropylmethoxy, 5-cyclobutylmethoxy, 5-isopropoxy-analogs of compounds within the scope of this invention are prepared from 2-methyl-5-hydroxy-3-indolylglycolate. Allyl bromide is used to prepare other corresponding 5-allyl compounds.

Example 33.—Propyl O-[1-(p-chlorobenzoyl)-2-methyl-5-methoxy-3-indolyl] glycolate A solution of 0.005 m. of N,N-dicyclohexylcarbodiimide in 60 ml. of tetrahydrofuran is added to an equimolar quantity of 1 - (p-chlorobenzoyl)-2-methyl-5-methoxy-3-indolyl glycolic acid in 25 ml. of tetrahydrofuran containing a slight molar excess of n-propyl alcohol. The reaction mixture is shaken vigorously and allowed to stand at about 25° C. for about 16 hours. The dicyclohexyl urea is filtered off and 2 ml. of glacial acetic acid is added to the filtrate. The mixture is allowed to stand for one hour. The solution is filtered and about 200 ml. of ether is added to the filtrate. The filtrate is then extracted well with water, dried over anhydrous sodium sulfate and concentrated in vacuo to leave the desired product as a residue. It may be purified by chromatography on alumina using ether-petroleum ether as an eluent.

This procedure is used to prepare propyl esters of other free acids of this invention prepared in accordance with the herein examples.

Replacement of propyl alcohol with such alcohols as methyl, ethyl, isopropyl, sec-butyl, amyl, hexyl, octyl, nonyl, allyl, 3-methyl-but-2-enyl, propynyl, but-2-ynyl, cyclohexyl, cyclopropyl, cyclopropylmethyl, phenol, p-acetamino-phenol, o-carboxy-phenol, o-carbamyl-phenol, β-methoxyethyl, β-ethoxyethyl, tetrahydro-furfuryl, 1,3-dimethoxy glycerol, mannitol, sorbitol, β-diethylaminoethyl, β-dimethylaminoethyl, β-dimethylamino-propyl, 2-dimethyl-3-diethylaminopropyl, 1,2-dimethyl-3 - dimethylaminopropyl, β-phenylethyl, β-(p-methoxyphenyl) ethyl, 3-phenyl-prop-2-enyl, benzyl, N-(β-hydroxy-ethyl), piperidine, N-β-(hydroxyethyl)-pyrrolidine, N-(hydroxymethyl) pyrrolidine, N - (β-hydroxyethyl)morpholine, 4-dimethylaminocyclohexyl, N - methyl-2-hydroxymethylpyrrolidine, N-methyl-2-hydroxymethyl, N-methyl-2-hydroxymethyl-piperidine, N-ethyl-3-hydroxy-piperidine and N-(β-hydroxyethyl)-N'-methyl-piperazine affords the corresponding esters.

Example 34.—Preparation of acid addition salts

Acid addition salts of the free bases prepared in accordance with the foregoing examples are prepared in one of two ways.

In one procedure, which is especially applicable to volatile acids such as hydrogen chloride, the acid is bubbled into a solution of the free base in a solvent such as ether. The acid generally precipitates as it forms and may be recovered by filtration. If it does not precipitate it can be recovered by distilling the solvent.

In the second procedure a concentrated solution of the acid in methanol or ethanol is added to a concentrated solution of the free base in the same solvent. Again the addition salt generally precipitates on standing, but if necessary, it can be recovered by removal of the alkanol in vacuo.

Using one or both of these procedures acid addition salts are prepared from the following acids: hydrochloric, hydrobromic, hydriodic, sulfuric, succinic, phosphoric, maleic, tartaric, citric and glycolic.

I claim:
1. Methyl O-[1-(p-chlorobenzoyl)-2-methyl-5-methoxy-3-indolyl] glycolate.
2. Methyl O-[1-(p-methylthiobenzoyl)-2-methyl-5-methoxy-3-indolyl] glycolate.
3. β-Diethylaminoethyl O-[1-(p-chlorobenzoyl)-2-methyl-5-methoxy-3-indolyl] glycolate.
4. β-Diethylaminoethyl O-[1-(p-methylthiobenzoyl)-2-methyl-5-methoxy-3-indolyl] glycolate.
5. β-(N-morpholino) ethyl O-[1(p-chlorobenzoyl)-2-methyl-5-methoxy-3-indolyl] glycolate.
6. β-Ethoxyethyl O-[1-(p-chlorobenzoyl)-2-methyl-5-methoxy-3-indolyl] glycolate.
7. A compound of the formula

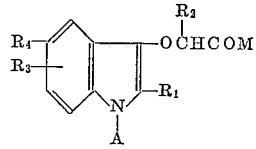

wherein A is selected from the group consisting of benzoyl; substituted benzoyl wherein said substituent is selected from the group consisting of lower alkoxy, halogen, lower alkylamino, lower dialkylamino, methyl, methylthio, trifluoromethyl, acetoxy, benzyloxy, hydroxy, phenoxy, trifluoroacetyl, p - N,N-dimethylsulfamyl; and 2'-thenoyl; α-naphthoyl; β-naphthoyl; 5-chloro-2-thenoyl; 5-chloro-2-furoyl; 2,5-dimethyl-3-thenoyl; 5-trifluoromethyl-2-furoyl; 3,4,5-trimethyl-2-thenoyl; 2-methyl-5-bromo-3-furoyl; 5-phenyl-2-thenoyl; 4-bromo-3-thenoyl; 1-methyl-2 - pyrrolylcarbonyl; nicotinoyl; 6 - chloronicotinoyl; 2-methyl-5-iodoisonicotinoyl; 6-chloroquinaldolyl; 5-cyano-6 - methyl-2-trifluoromethylnicotinoyl; 2-o-fluorophenyl-4-quinolylcarbonyl; 1 - isoquinolylcarbonyl; picolinoyl; 2-benzylthioisonicotinoyl; 5-chloro-2-thiazolylcarbonyl; 4-thiazolylcarbonyl; 1-pyrazolylcarbonyl; 2-benzyl-5-chloro-4 - oxazolylcarbonyl; 2-methyl-5-trifluoromethyl-4-oxazolylcarbonyl; 2-methylthio-5-methyl-1 - imidazolylcarbonyl; 2 - bromo-4-thiazolylcarbonyl; 5-phthalimido-2-thiazolylcarbonyl; 4-methyl-4-morpholinothio-5-thiazolylcarbonyl; 3 - methyl-5-isothiazolylcarbonyl; 4-1,2,3-thiadiazolylcarbonyl; 5-phenyl-4-1,2,3-thiadiazolylcarbonyl; 1-phenyl-3-pyrazolylcarbonyl; 1,3,5-trimethyl-4 - pyrazolylcarbonyl; 2 - benzimidazolylcarbonyl; 2-methyl-7-nitro-5-benzimidazolylcarbonyl; 6-fluoro-2-indolylcarbonyl; 3 - indazolylcarbonyl; 4-benzofuroylcarbonyl; 2-methyl-5-benzothiazolylcarbonyl; 3-benzisoxazolylcarbonyl; 5-benzoxazolylcarbonyl; 2-ethyl-2,3-dihydro-7-thianaphthylcarbonyl; 6-nitro-6-isoindazolylcarbonyl; 2-benzisoxazolylcarbonyl; 2-benzothiophenecarbonyl; 5 - pyrimidylcarbonyl; 3-pyridazinylcarbonyl; 2-benzylmercapto-4-chloro-5 - pyrimidylcarbonyl; 4 - morpholinomethyl-2-phenyl-5-pyrimidylcarbonyl; 6-chloro-3-pyridazinylcarbonyl and 6-methylpyrazinoyl;

$R_1$ is lower alkyl;
$R_2$ is selected from the group consisting of hydrogen, phenyl and lower alkyl;
$R_3$ is selected from the group consisting of hydrogen, halogen, trifluoromethyl, lower alkyl and lower alkoxy;
$R_4$ is selected from the group consisting of hydrogen, hydroxy, halogen, lower alkyl, lower alkoxy, amino, amino lower alkyl, lower alkyl amino, dilower alkylamino, cyano, nitro, mercapto, lower alkylthio, pyrrolidino, acetamido, N-methyl carbobenzyloxy amino, bis(β-hydroxyethyl)amino, 4 - methylpiperazino, morpholino and allyloxy;
M is selected from the group consisting of hydroxyl, amino, lower alkoxy, lower alkenyloxy, lower alkynyloxy; and
OY wherein Y is selected from the group consisting of cations and

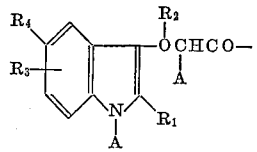

wherein A, $R_1$, $R_2$, $R_3$ and $R_4$ are as defined above, and the pharmaceutically acceptable acid addition salts of such compounds.

References Cited

Reeve et al.: Tetrahedron, vol. 19, pages 1243–49 (1963).

ALEX MAZEL, *Primary Examiner.*

J. TOVAR, *Assistant Examiner.*